United States Patent
Sun et al.

(10) Patent No.: US 11,941,747 B2
(45) Date of Patent: Mar. 26, 2024

(54) DELIVERING A VIRTUAL ENVIRONMENT WITH DYNAMIC LEVEL OF DETAIL PER OBJECT

(71) Applicant: Adobe Inc., San Jose, CA (US)

(72) Inventors: Qi Sun, San Jose, CA (US); Xin Sun, San Jose, CA (US); Stefano Petrangeli, San Jose, CA (US); Shaoyu Chen, San Jose, CA (US); Li-Yi Wei, San Jose, CA (US); Jose Ignacio Echevarria Vallespi, San Jose, CA (US)

(73) Assignee: Adobe Inc., San Jose, CA (US)

( * ) Notice: Subject to any disclaimer, the term of this patent is extended or adjusted under 35 U.S.C. 154(b) by 197 days.

(21) Appl. No.: 17/515,079

(22) Filed: Oct. 29, 2021

(65) Prior Publication Data

US 2023/0132642 A1 May 4, 2023

(51) Int. Cl.
*G06T 15/20* (2011.01)
*G06F 3/01* (2006.01)
*G06N 20/00* (2019.01)
*G06T 7/70* (2017.01)

(52) U.S. Cl.
CPC ............ *G06T 15/20* (2013.01); *G06F 3/013* (2013.01); *G06N 20/00* (2019.01); *G06T 7/70* (2017.01); *G06T 2210/36* (2013.01)

(58) Field of Classification Search
CPC .......... G06T 7/70; G06T 15/20; G06T 15/00; G06T 2210/36; G06T 19/006; G06T 19/20; G06T 17/00; G06N 20/00; G06F 3/011; G06F 3/013; G06V 40/20; G06V 10/761
See application file for complete search history.

(56) References Cited

U.S. PATENT DOCUMENTS 8,471,849 B1 * 6/2013 Hickman ............... G06F 3/013
345/428
2018/0088667 A1 * 3/2018 Knorr ..................... G06F 3/048
(Continued)

OTHER PUBLICATIONS

Arabadzhiyska et al., Saccade Landing Position Prediction for Gaze-Contingent Rendering, ACM Transactions on Graphics, vol. 36, No. 4, Article 50, Jul. 2017, 12 pages.
(Continued)

*Primary Examiner* — Xilin Guo
(74) *Attorney, Agent, or Firm* — Kilpatrick Townsend & Stockton LLP

(57) ABSTRACT

A method includes accessing a first object in a virtual environment, the first object representing a first asset at a first level of detail (LoD). A second object is generated to represent the first asset at a second LoD having decreased complexity. The method further includes determining a first importance value for the first asset and, based on the first importance value, selecting the first object to represent the first asset. Additionally, the method includes accessing a third object representing the second asset at the first LoD and generating a fourth object representing the second asset at the second LoD. The method further includes determining a second importance value, lower than the first importance value, for the second asset and selecting the fourth object to represent the second asset. The method further includes causing a client device to update a display of the virtual environment by transmitting the selected objects.

20 Claims, 5 Drawing Sheets

(56) References Cited

U.S. PATENT DOCUMENTS

2018/0160160 A1* 6/2018 Swaminathan ...... H04N 21/816
2021/0056306 A1* 2/2021 Hu ..................... G06V 20/59

OTHER PUBLICATIONS

Barten, Formula for the Contrast Sensitivity of the Human Eye, Image Quality and System Performance, vol. 5294, Dec. 18, 2003, pp. 231-238, Abstract, pp. 1-3.

Cohen et al., The Limits of Color Awareness During Active, Real-World Vision, Proceedings of the National Academy of Sciences, vol. 117, No. 24, Jun. 16, 2020, pp. 13821-13827.

Cohen-Or et al., Deep Compression for Streaming Texture Intensive Animations, in SIGGRAPH '99, Jul. 1999, pp. 261-267.

Ferwerda et al., A Model of Visual Masking for Computer Graphics, in SIGGRAPH '97, Aug. 1997, pp. 143-152.

Griffin et al., Evaluating Texture Compression Masking Effects Using Objective Image Quality Assessment Metrics, IEEE Transactions on Visualization and Computer Graphics, vol. 21, No. 8, Aug. 1, 2015, pp. 970-979, Abstract, pp. 1-3.

Guenter et al., Foveated 3D Graphics, ACM Transactions on Graphics, vol. 31, No. 6, Article 164, Nov. 2012, 10 pages.

Gutterman et al., Stallion: Video Adaptation Algorithm for Low-Latency Video Streaming, MMSys '20: Proceedings of the 11th ACM Multimedia Systems Conference, May 2020, pp. 327-332.

Hladky et al., The Camera Offset Space: Real-Time Potentially Visible Set Computations for Streaming Rendering, ACM Transactions on Graphics, vol. 38, No. 6, Article 231, Nov. 2019, 14 pages.

Hristova et al., 3CPS: A Novel Supercompression for the Delivery of 3D Object Textures, MMSys '20: Proceedings of the 11th ACM Multimedia Systems Conference, May 2020, pp. 66-76.

Hu et al., Reducing Simulator Sickness with Perceptual Camera Control, ACM Transactions on Graphics, vol. 38, No. 6, Article 210, Nov. 2019, 12 pages.

Kaplanyan et al., DeepFovea: Neural Reconstruction for Foveated Rendering and Video Compression Using Learned Statistics of Natural Videos, ACM Transactions on Graphics, vol. 38, No. 6, Article 212, Nov. 2019, 13 pages.

Knoell et al., Spatiotemporal Profile of Peri-Saccadic Contrast Sensitivity, Journal of Vision, vol. 11, No. 14, Article 15, Dec. 16, 2011, pp. 1-12.

Konrad et al., Gaze-Contingent Ocular Parallax Rendering for Virtual Reality, ACM Transactions on Graphics, vol. 39, Issue 2, Article 10, Jan. 2020, pp. 10:1-10:12.

Krajancich et al., Optimizing Depth Perception in Virtual and Augmented Reality Through Gaze-Contingent Stereo Rendering, ACM Transactions on Graphics, vol. 39, No. 6, Article 269, Dec. 2020, pp. 269:1-269:10.

Lavoue et al., A Psychophysical Evaluation of Texture Compression Masking Effects, IEEE Transactions on Visualization and Computer Graphics, vol. 25, No. 2, Feb. 28, 2018, pp. 1-12.

Levoy, Polygon-Assisted JPEG and MPEG Compression of Synthetic Images, in SIGGRAPH '95: Proceedings of the 22nd annual conference on Computer graphics and interactive techniques, Sep. 1995, pp. 21-28.

Li et al., Towards Streaming Perception, In ECCV, Available Online at: https://arxiv.org/pdf/2005.10420.pdf, Aug. 25, 2020, pp. 1-39.

Luebke et al., Level of Detail for 3D Graphics, Morgan Kaufmann Publishers Inc., 2002, pp. 1-412.

Luidolt et al., Gaze-Dependent Simulation of Light Perception in Virtual Reality, IEEE Transactions on Visualization and Computer Graphics, vol. 26, No. 12, Dec. 2020, pp. 3557-3567, pp. 1-11, Authors version.

Murphy et al., Gaze-Contingent Level of Detail Rendering, Eurographics, Jan. 2001, 10 pages.

Patney et al., Towards Foveated Rendering for Gaze-Tracked Virtual Reality, ACM Transactions on Graphics, vol. 35, No. 6, Article 179, Nov. 2016, 12 pages.

Peli, Contrast in Complex Images, Journal of the Optical Society of America A, vol. 7, No. 10, Oct. 1990, pp. 2032-2040.

Petrangeli et al., Dynamic Adaptive Streaming for Augmented Reality Applications, in 2019 IEEE International Symposium on Multimedia (ISM), Nov. 24, 2019, pp. 1-8.

Raca et al., Beyond Throughput, the Next Generation: A 5G Dataset with Channel and Context Metrics, in MMSys '20: Proceedings of the 11th ACM Multimedia Systems Conference, May 2020, pp. 303-308.

Rashidi et al., Optimal Visual Search Based on a Model of Target Detectability in Natural Images, 34th Conference on Neural Information Processing Systems (NeurIPS 2020), Dec. 2020, 12 pages.

Riiser et al., Commute Path Bandwidth Traces from 3G Networks: Analysis and Applications, in Proceedings of the 4th ACM Multimedia Systems Conference (MMSys '13), Association for Computing Machinery, Feb. 2013, pp. 114-118.

Romero-Rondon et al., Foveated Streaming of Virtual Reality Videos, in Proceedings of the 9th ACM Multimedia Systems Conference (MMSys '18), Jun. 2018, pp. 494-497.

Rusinkiewicz et al., QSplat: A Multiresolution Point Rendering System for Large Meshes, in SIGGRAPH '00, Jul. 2000, pp. 343-352.

Schutz et al., Progressive Real-Time Rendering of One Billion Points Without Hierarchical Acceleration Structures, Computer Graphics Forum, vol. 39, No. 2, May 2020, pp. 51-64.

Schwarz et al., On Predicting Visual Popping in Dynamic Scenes, in APGV '09: Proceedings of the 6th Symposium on Applied Perception in Graphics and Visualization, Sep. 2009, pp. 93-100.

Serrano et al., Motion Parallax for 360° RGBD Video, IEEE Transactions on Visualization and Computer Graphics, vol. 25, No. 5, May 2019, pp. 1817-1827.

Serrano et al., Movie Editing and Cognitive Event Segmentation in Virtual Reality Video, ACM Transactions on Graphics, vol. 36, No. 4, Article 47, Jul. 2017, pp. 1-12.

Shuai et al., OLAC: An Open-Loop Controller for Low-Latency Adaptive Video Streaming, in 2015 IEEE International Conference on Communications (ICC), Sep. 10, 2015, pp. 6874-6879.

Simon et al., Streaming a Sequence of Textures for Adaptive 3D Scene Delivery, in 2019 IEEE Conference on Virtual Reality and 3D User Interfaces (VR), 2019, pp. 1159-1160, Abstract, pp. 1-3.

Sitzmann et al., Saliency in VR: How Do People Explore Virtual Environments? IEEE Transactions on Visualization and Computer Graphics, vol. 24, No. 4, Apr. 2018, pp. 1633-1642, Abstract, pp. 1-3.

Sun et al., Perceptually-Guided Foveation for Light Field Displays, ACM Transactions on Graphics, vol. 36, No. 6, Nov. 2017, 13 pages.

Sun et al., Towards Virtual Reality Infinite Walking: Dynamic Saccadic Redirection, ACM Transactions on Graphics, vol. 37, No. 4, Article 67, Aug. 2018, 13 pages.

Wang et al., Foveated Wavelet Image Quality Index, in Applications of Digital Image Processing XXIV, vol. 4472. International Society for Optics and Photonics, Dec. 7, 2001, pp. 1-12.

Wang et al., Multi-Scale Structural Similarity for Image Quality Assessment, Proceedings of the 37th IEEE Asilomar Conference on Signals, Systems and Computers, vol. 2, Nov. 9-12, 2003, pp. 1398-1402.

Watson, A Formula for Human Retinal Ganglion Cell Receptive Field Density as a Function of Visual Field Location, Journal of Vision, vol. 14, No. 7, Article 15, Jun. 30, 2014, pp. 1-17.

Weier et al., Perception-Driven Accelerated Rendering, in Computer Graphics Forum, vol. 36, May 2017, pp. 1-33.

* cited by examiner

US 11,941,747 B2

DELIVERING A VIRTUAL ENVIRONMENT WITH DYNAMIC LEVEL OF DETAIL PER OBJECT

TECHNICAL FIELD

This disclosure generally relates to computer graphics. More specifically, this disclosure relates to techniques for dynamically adjusting levels of detail for virtual objects, such as for the purpose of immersive streaming of multimedia content.

BACKGROUND

Immersive streaming of multimedia content, such as in virtual reality (VR) or augmented reality (AR) environments, has become widely used in various fields, including entertainment, education, training, manufacturing, and medicine. In immersive streaming, a computer system provides a virtual environment to a user by generating images (e.g., still images or images serving as frames of video content) of assets, such as three-dimensional (3D) assets, that replace or augment the real world. For instance, the user could be wearing a VR headset to enable display of such images in a manner that makes the user feel immersed in the virtual environment.

Immersive streaming typically involves the operation of both a server and a client device. The server has access to a set of assets that are part of the virtual environment. Typically, each asset is stored at a high level of detail (e.g., including a high quantity of vertices or other defining elements). As the user interacts with the virtual environment, such as by virtually moving around or changing perspectives within the environment, the server sends updates to the client device, where each update includes new assets or updates to the existing assets that the client device must render and display to the user.

Given the significant advances that have been made in graphics processing units, the client device is able to quickly render and display the assets received, even given the potentially high complexity of those assets. However, there can often be a bottleneck in the transmission of the assets from the server to the client device, for example, due to client device bandwidth (i.e., bandwidth available for transmissions to the client device), speed, or throughput limitations of the network to which the client device is connected or due to the capabilities of the client device, such as the network interface components of the client device. Such limitations can cause the client device to not receive the assets as quickly as needed, leading to a latency that interrupts the user experience.

SUMMARY

In some embodiments, an immersive graphics system provides a virtual environment with dynamic level of detail for each object in the virtual environment, so as to intelligently utilize network resources while prioritizing objects most likely to impact a user's experience. In one example, a computing system, such as a graphics server, performs operations described below.

For instance, the graphics server accesses a first object representing a first asset at a first level of detail (LoD), where the first asset is located in a virtual environment. The graphics server generates a second object representing the first asset at a second LoD, where the second LoD has decreased complexity as compared to the first LoD. For instance, the first asset is a unit asset in the virtual environment, such as an entity or portion of an entity located in the virtual environment, and each of the first object and the second object are versions of the first asset at different LoDs. The graphics server determines a first importance value for the first asset, where the first importance value could be based on a gaze position of a user. Given the first importance value of the first asset, an embodiment of the graphics server selects the first object over the second object to represent the first asset at the first LoD in the virtual environment.

Further, in some embodiments, the graphics server accesses a third object representing a second asset at the first LoD, where the second asset, like the first asset, is located in a virtual environment. The graphics server generates a fourth object representing the second asset at the second LoD. The graphics server determines a second importance value for the second asset, where the second importance value is based on the gaze position of a user and is lower than the first importance value. Given the second importance value of the second asset, an embodiment of the graphics server selects the fourth object over the third object to represent the second asset at the second LoD in the virtual environment. Because the first asset is associated with a higher importance value, the first object chosen to represent the first asset has a higher level of detail than the fourth object chosen to represent the second asset. The graphics server may cause a client device to update a display of the virtual environment by transmitting the selected first object and fourth object to the client device.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
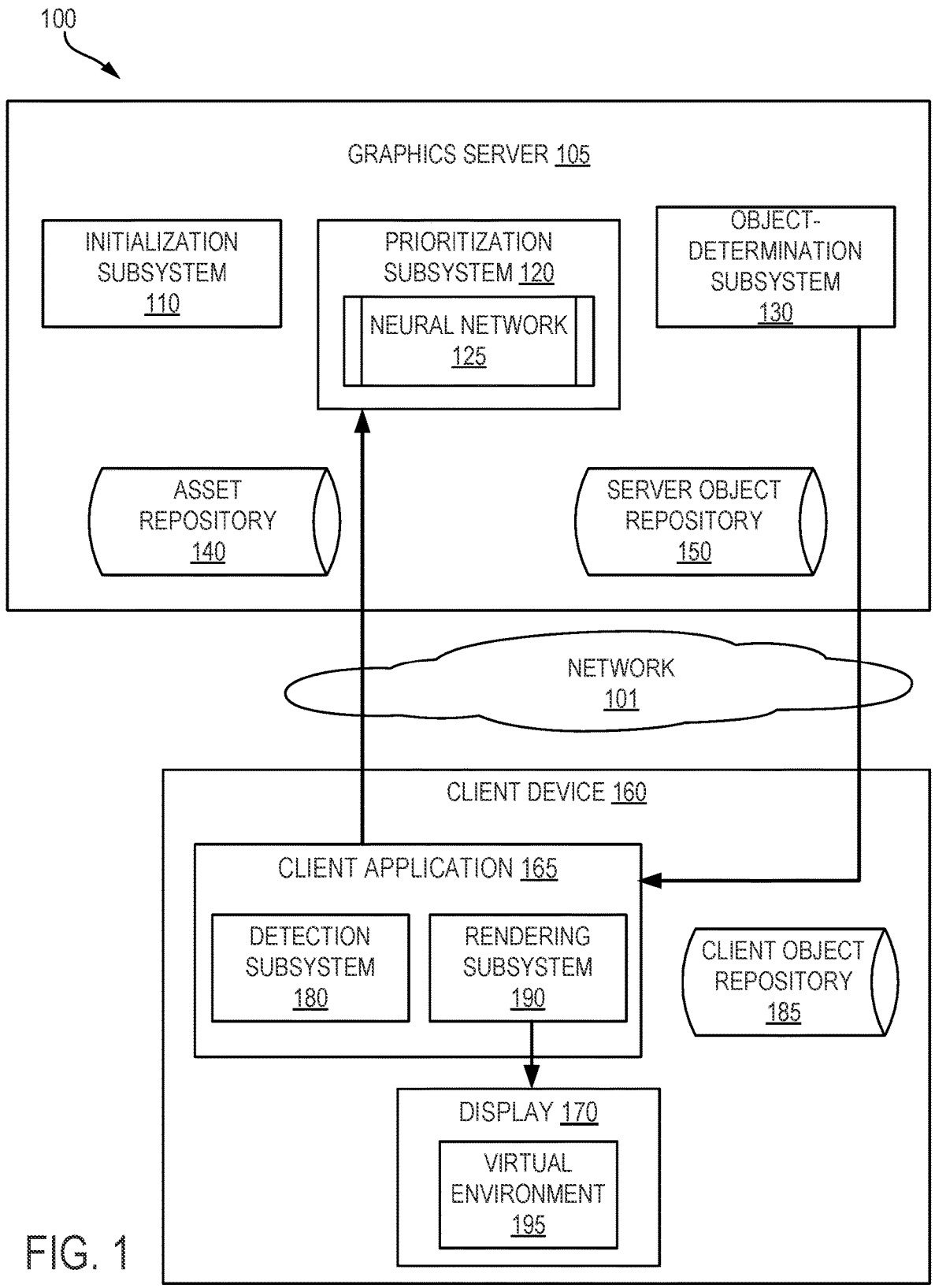
FIG. 1 is a diagram of an example of an immersive graphics system for providing a virtual environment with dynamic levels of detail, according to certain embodiments of this disclosure.

The present disclosure includes systems and methods for immersive streaming to provide a virtual environment including assets, which can be either two-dimensional (2D) or three-dimensional (3D), having dynamic levels of detail. As explained above, conventional techniques do not address the potentially limited capabilities of a network, such as client device bandwidth (i.e., network bandwidth available for transmissions to the client device) or such as the client device's capabilities. Certain embodiments described herein improve upon such techniques by dynamically prioritizing assets in a virtual environment such that assets having a greater impact on user experience are transmitted to a client device at a high level of detail while assets that have lesser impact can be transmitted at a comparatively low level of detail, thus intelligently utilizing the network bandwidth or the client device's capabilities.

The following non-limiting example is provided to introduce certain embodiments. In this example, a computer system implements aspects of an immersive graphics system. The computer system acts as a server, communicating with a client device to cause the client device to provide a 3D virtual environment to a user. To initialize the immersive 3D virtual environment, the computer system accesses a set of assets that are part of the 3D virtual environment. These assets can be, for instance, digital descriptions of entities located in the 3D virtual environment, such as people, creatures, structures, or other items or portions of people, creatures, structures, or items. In some embodiments, each asset is a unit block or, in other words, the smallest element into which an entity is broken down for the purposes of the immersive graphics system 100. For example, an asset can be a hand, a finger, or another shape making up a larger thing. For each asset, the computer system generates a set of objects, each of which individually represents that asset at a respective level of detail (LoD). In other words, each object is a version of the asset at a respective LoD. The entire set of objects associated with an asset represents that asset at various LoDs, with each object corresponding to a single one of such LoDs. Generally, an object with a higher LoD has greater complexity such that the object includes more detail than an object for the same asset at a lower LoD. As a result, the network bandwidth needed to transmit that object generally increases as the LoD increases. As described herein, some examples intelligently determine which LoD to use for each asset to optimize the perceptual experience for the user given the available bandwidth of the network.

To that end, in this example, the computer system receives from the client device information describing the user's position, orientation, and gaze position (i.e., the display coordinates at which the user is believed to be looking), The computer system then determines a respective importance value for each asset visible to the user, based on the user's position, orientation, and gaze position. Given the available bandwidth, the computer system selects a set of objects to transmit to the client device, based on the various importance values assigned to the assets. In the set of objects, a first object representing a first asset with a high importance value has a higher LoD than a second object representing a second asset with a lower importance value. In other words, a lower LoD is deemed more acceptable for objects with lower importance values. Because importance values are based on a user's gaze position, the result is that transmission priority (e.g., bandwidth priority) is given to assets that are most likely to impact the user's perception of the experience.

In this example, the computer system causes the client device to provide the 3D virtual environment by transmitting, to the client device, the set of objects selected based on the importance values. The client device utilizes the set of objects, possibly in addition to objects previously received, to render one or more frames to provide the 3D virtual environment.

Certain embodiments described herein provide improvements m the technical field of computer graphics, in particular the field of multimedia streaming and rendering of virtual or augmented reality environments. Given the advancements in graphics processing units (GPUs), a bottleneck in the generation of immersive environments is the network's capabilities, such as client device bandwidth. Embodiments described herein overcome the bottleneck issue by prioritizing the use of network resources, such as bandwidth, by selectively determining which LoD to use for each asset so as to provide a perceptually satisfying experience for the user without having to utilize the highest level of detail for every asset.

Referring now to the drawings, FIG. 1 shows an example of an immersive graphics system 100, according to certain embodiments of this disclosure. An example of the immersive graphics system 100 facilitates immersive streaming, such as to provide a virtual reality (VR) or augmented reality (AR) experience.

The directions of the various arrows shown in FIG. 1 illustrate an example communications flow; however, these directional arrows are provided for illustrative purposes only and do not limit the various embodiments described herein. The embodiment depicted in FIG. 1 is merely an example and is not intended to unduly limit the scope of claimed embodiments. Many possible variations, alternatives, and modifications are within the scope of this disclosure. For example, in some implementations, more or fewer systems or components than those shown in FIG. 1 may be provided, two or more systems or components may be combined, or a different configuration or arrangement of systems and components may be provided. In some embodiments, the immersive graphics system 100 is implemented as part of one or more computing systems, such as a graphics server 105 and one or more client devices 160 as shown in FIG. 1. The immersive graphics system 100 is implemented as hardware, software (e.g., firmware), or a combination of hardware and software.

As shown in FIG. 1, an embodiment the graphics server 105 executes some or all aspects of the immersive graphics system 100. The graphics server 105 can be a computer system of various types, such as one or more server computers, desktop computers, notebook computers, or other computing devices. Aspects of the immersive graphics system 100 are implemented as program code stored in a non-transitory computer-readable medium on the graphics server 105 or as a specialized hardware device, such as a field-programmable gate array, installed on the graphics server 105. Additionally or alternatively, an example of the graphics server 105 runs on a distributed system of computing devices. For example, the graphics server 105 is implemented by one or more computing systems of a cloud service provider infrastructure.

As shown in FIG. 1, an embodiment of the graphics server 105 includes an initialization subsystem 110, a prioritization subsystem 120 and an object-determination subsystem 130. An example of the initialization subsystem 110 generates, for each asset in the 3D virtual environment, a respective set of objects at varying levels of detail representing that asset. For each update to be provided to a client device 160 (e.g., when a user at the client device 160 moves or changes a gaze), an example of the prioritization subsystem 120 prioritizes various assets in the 3D virtual environment, specifically, for instance, by assigning respective importance values to the assets. In some embodiments, the prioritization subsystem 120 utilizes a machine-learning model, such as a neural network 125, to assign importance values, as described in more detail below. An example of the object-determination subsystem 130 determines which objects representing the assets to transmit to a client device 160 to cause the client device 160 to provide the virtual environment 195. Each of the initialization subsystem 110, the prioritization subsystem 120, and the object-determination subsystem 130 can be implemented as hardware, software, or a combination of hardware and software. Further, although these subsystems of the immersive graphics system 100 are shown and described herein as being distinct from one another, this distinction is made for illustrative purposes only; the initialization subsystem 110, the prioritization subsystem 120, and the object-determination subsystem 130 can share hardware or software or can be further subdivided. Various implementations are within the scope of disclosure.

In some embodiments, the graphics server 105 further includes, or otherwise utilizes, an asset repository 140 and a server object repository 150, which can be accessible by each of the initialization subsystem 110, the prioritization subsystem 120, or the object-determination subsystem 130 to facilitate performance of the operations described herein. The asset repository 140 maintains definitions of assets located in the 3D virtual environment 195. The server object repository 150 maintains data structures that define objects representing the assets. For instance; an asset in the asset repository is represented in the server object repository 150 by multiple objects at various LoDs. For instance, an object is stored in the server object repository 150 as an array (e.g., an ordered array of vertices or polygonal faces of a mesh), a linked list, a point cloud, or some other data structure. Each of the server object repository 150 and the asset repository 140 is, for example, a database, one or more tables of a database, one or more text files, or one or more other storage objects. For instance, each of the asset repository 140 or the server object repository 150 may be a portion of a storage device of the graphics server 105.

In some embodiments, the graphics server 105 communicates with each of one or more client devices 160 over a network 101. The network 101 may be one or more of various types of data networks. An example of the network 101 is one or a combination of local area networks or wide area networks using wired communication systems, wireless communication systems, or a combination thereof. The network 101 may be, for example, a local network or the internet. In some examples, the network 101 can use standard communications technologies or protocols. For example, the network 101 can include communication links using technologies such as Ethernet, 802.11, worldwide interoperability for microwave access (WiMAX), 3G, 4G, code division multiple access (CDMA), digital subscriber line (DST), or other technologies.

Each client device 160 may be a computing device, such as a desktop computer, a notebook computer, a tablet, a smartphone, or some other consumer device or other computing device. In some examples, the client device 160 is a headset or other device wearable by the user to provide a VR or AR experience. In some embodiments, multiple client devices 160 participate in the immersive graphics system 100, and each of such client devices 160 communicates with the graphics server 105 during participation in the immersive graphics system 100. Thus, although some examples herein refer to only a single client device 160, the operations described herein can apply to each client device 160 involved in the immersive graphics system 100. For instance, operations described as being performed by a client device 160 may be performed by each client device 160 to deliver the 3D virtual environment to each user utilizing the various client devices 160. Each user at each client device 160 can interact with the virtual environment 195 in different ways, and for each such client device 160, an embodiment of the graphics server 105 responds by sending the appropriate objects with appropriate LoDs to each client device 160.

In some embodiments, a client device 160 is connected to a display 170 and executes a detection subsystem 180 and a rendering subsystem 190, which may be incorporated into a client application 165. The client application 165 may be, for example, an installed application, a web application, or one or more other processes running on the client device 160. Additionally, the client device 160 may maintain a client object repository 185. Generally, an example of the detection subsystem 180 detects information (e.g., position, orientation, and gaze) about a user utilizing the client device 160; the client device 160 receives objects from the graphics server 105 and stores such objects in the client object repository 185; and based on the objects in the client object repository, the rendering subsystem 190 renders frames showing the virtual environment 195 for output to the display 170.

The detection subsystem 180 and the rendering subsystem 190 can be implemented as hardware, software, or a combination of both, Although the detection subsystem 180 and the rendering subsystem 190 are illustrated and described as being distinct, this distinction is for illustration purposes only; the detection subsystem 180 and the rendering subsystem 190 can be implemented with shared hardware, software, or both. Additionally, the client object repository 185 may be a database, one or more tables of a database, one or more text files, or one or more other storage objects. For instance, the client object repository 185 may be a portion of a storage device of the client device 160.

An embodiment of the detection subsystem 180 detects the user information, such as the user's position, orientation, and gaze. Implementation of the gaze detection subsystem 180 may be dependent on implementation of the client device 160. For instance, if the client device is a headset, such as a VR or AR headset, then the detection subsystem 180 detects data describing the movement and orientation of the headset and, from this data, determines one or more of the user's position, orientation, or gaze. Various techniques exist for determining the user's position and orientation, and an embodiment of the detection subsystem 180 uses one or more of such techniques. Further, various techniques exist for determining a user's gaze position, and the detection subsystem 180 may use one or more of such techniques or future techniques. For example, the detection subsystem 180 may implement an eye-tracking technology and, based on the eye tracking, may determine a gaze position (i.e., the coordinates in screen space of a point at which the user is believed to be looking).

As mentioned above and described further below, the graphics server 105 may transmit to the client device 160 objects representing assets in the virtual environment 195. In some embodiments, the rendering subsystem 190 running on the client device 160 thus accesses such objects, which are stored on the client device 160. The rendering subsystem 190 renders frames based on the objects the client device 160 has received either in the most recent update (i.e., the most recent set of objects received from the graphics server 105) or in prior updates (i.e., objects received prior to the most recent set of objects). Various techniques exist for rendering objects (e.g., using a graphics processing unit (GPU) given objects in a virtual environment, user position, and user orientation, and an embodiment of the rendering subsystem 190 uses one or more of such techniques.

The display 170 can be various types of displays configured to output frames to a user. For instance, the display is a computer monitor, or in some examples, the display 170 is a VR or AR headset or a device (e.g., a smartphone) configured to be fit into a headset. The display 170 may be integrated with the client device 160 or may be otherwise connected to the client device 160, such as wirelessly or by way of a cable.

Figure 2:
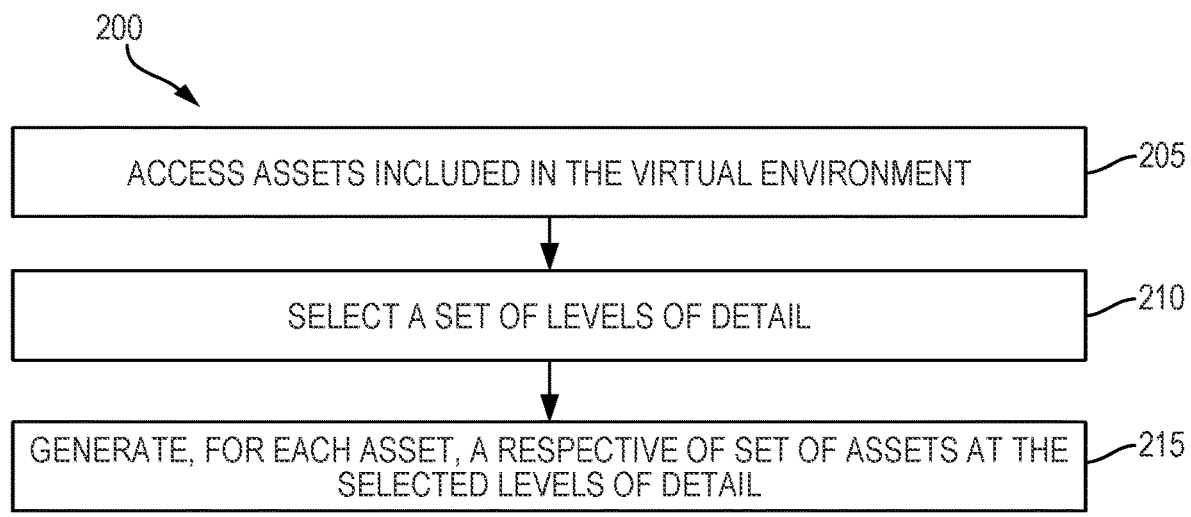
FIG. 2 is a flow diagram of an example of a process for initializing the immersive graphics system, according to certain embodiments of this disclosure.

FIG. 2 is a flow diagram of an example of a process 200 for initializing the immersive graphics system 100, according to certain embodiments of this disclosure. The process 200 depicted in FIG. 2 may be implemented in software (e.g., code, instructions, program) executed by one or more processing units of the computer system, implemented in hardware, or implemented in a combination of software and hardware. The process 200 presented in FIG. 2 and described below is intended to be illustrative and non-limiting. Although FIG. 2 depicts various processing operations occurring in a particular sequence or order, this is not intended to be limiting. In certain alternative embodiments, the processing may be performed in a different order, or some operations may also be performed in parallel. In some embodiments, this process 200 or similar is performed by the initialization subsystem 110 of the immersive graphics system 100.

As shown in FIG. 2, at block 205, the process 200 involves accessing assets included in the virtual environment 195. In some examples, the virtual environment 195 has previously been designed, and includes various assets that exist virtually in the virtual environment 195. These assets include, for instance, virtual people, creatures, structures, or other entities. In some embodiments, descriptions of these assets are stored in the asset repository 140. An embodiment of the initialization subsystem 110 thus accesses the assets by accessing the asset repository 140.

At block 210, the process 200 involves selecting a set of levels of detail. A level of detail defines an amount of complexity in an object or set of objects representing an asset. For instance, if an asset is described as a point cloud, then a higher LoD may include a greater number of vertices than a lower LoD. If an asset is described as a mesh, then a higher LoD may include a greater number of faces than a lower LoD. Levels of detail can be defined in various ways, and further, each level of detail may be defined differently for different types of data structures (e.g., point clouds versus meshes). Generally, however, the storage space needed to maintain an object increases as the LoD of that object increases, and thus, it takes more storage space to maintain an object at a higher LoD) as compared to a lower LoD. In some embodiments, the levels of detail are predefined, such as by the immersive graphics system 100. As such, the initialization subsystem 110 can select one or more of the predefined levels of detail for use.

At block 215, the process 200 involves generating, for each asset accessed at block 205, a respective set of objects representing the asset at the levels of detail selected at block 210, in some examples, each asset is described at its highest possible level of detail in the asset repository 140. Thus, to generate objects representing this asset at lower levels of detail, an embodiment of the initialization subsystem 110 down-samples the asset to create objects at lower levels of detail. After generating the objects at various levels of detail to represent an asset, the initialization subsystem 110 may store such objects in the server object repository 150.

Examples of Operations at a Client Device

After initialization of the immersive graphics system 100 (i.e., after generation of objects represents the assets at various levels of detail), a client device 160 may participate in the immersive graphics system 100 to enable a user to view and potentially interact with the virtual environment 195.

Figure 3:
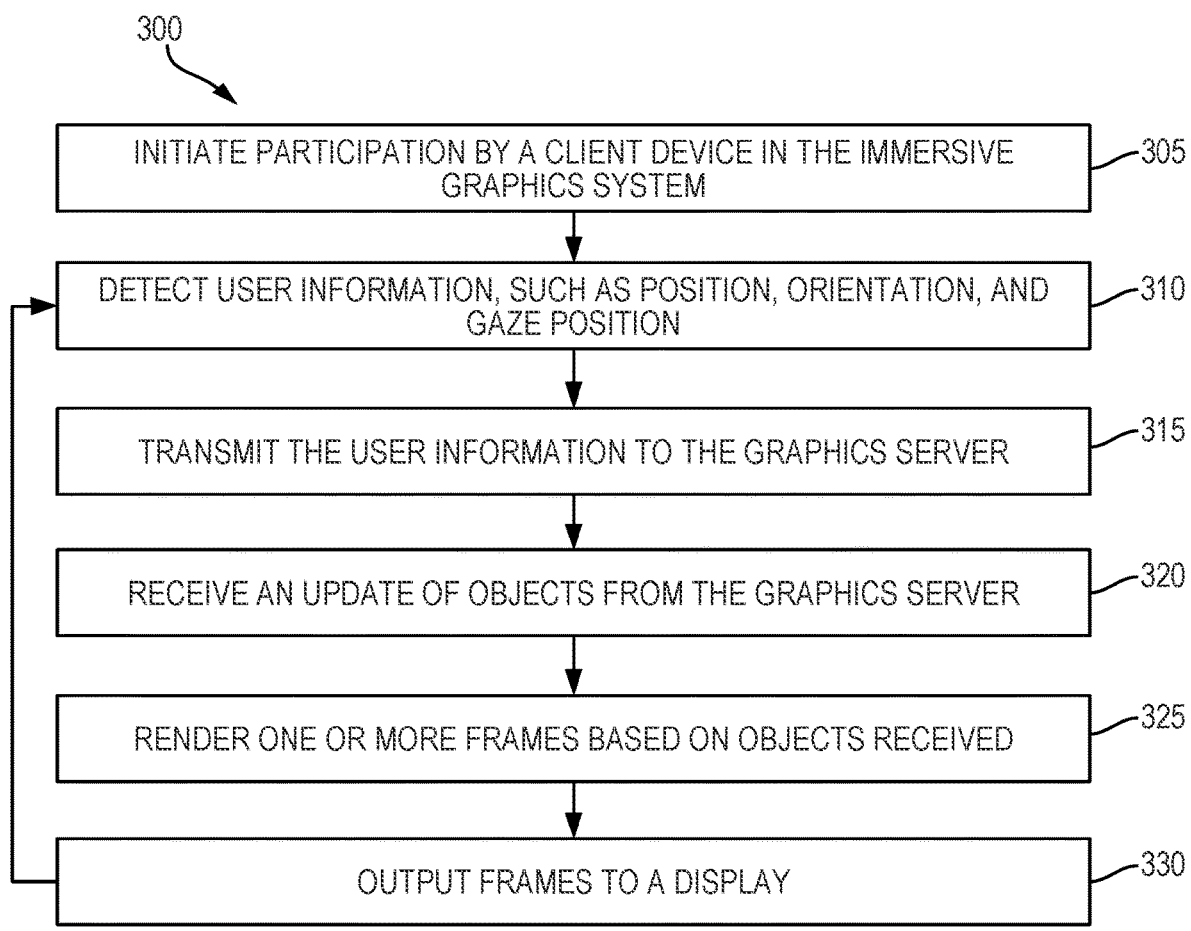
FIG. 3 is a flow diagram of an example of a process for generating and displaying frames of the virtual environment, according to certain embodiments of this disclosure.

FIG. 3 is a flow diagram of an example of a process 300 for generating and displaying frames of the virtual environment, according to certain embodiments of this disclosure. The process 300 depicted in FIG. 3 may be implemented in software (e.g., code, instructions, program) executed by one or more processing units of the computer system, implemented in hardware, or implemented in a combination of software and hardware. The process 300 presented in FIG. 3 and described below is intended to be illustrative and non-limiting. Although FIG. 3 depicts various processing operations occurring in a particular sequence or order, this is not intended to be limiting. In certain alternative embodiments, the processing may be performed in a different order, or some operations may also be performed in parallel. In some embodiments, this process 300 or similar is performed at runtime by the client device 160.

As shown in FIG. 3, at block 305, the process 300 involves joining or starting the immersive graphics system 100 at the client device 160. In some embodiments, the immersive graphics system 100 has already been initialized, for instance, as performed in the process 200 of FIG. 2, but at block 305, the client device 160 begins its operations for enabling a user at the client device 160 to view and possibly interact with the virtual environment 195 of the immersive graphics system 100.

At block 310, the process 300 involves detecting user information. In some embodiments, for instance, the detection subsystem 180 of the client device 160 detects the user's position and orientation in the virtual environment 195 as well as the user's gaze position in the screen space of the display 170. The detection subsystem may detect this user information repeatedly (e.g., multiple times per second), resulting in a stream of data representing the user information.

At block 315, the process 300 involves transmitting the user information to the graphics server 105. In some embodiments, the user information enables the graphics server 105 to determine importance values for the various assets and, thus, to select objects for transmission back to the client device 160. Additionally or alternatively, however, the client device 160 may compute the importance values locally and then transmit the importance values to the graphics server 105. In either case, some examples of the client device 160 send this client data, either the user information, the importance values, or both, to the graphics server 105 in a streaming manner such that the graphics server 105 receives real-time data useable for determining which objects to provide to the client device 160.

As such, at block 320, the process 300 involves receiving an update from the graphics server 105, based on the user information or importance values transmitted to the graphics server 105. In some embodiments, the update includes a set of objects representing assets of the virtual environment 195. The client device 160 stores the set of objects in the client object repository 185. Thus, the client object repository 185 may include not only objects from this update but additional objects from previous updates based on user information from previous points in time.

At block 325, the process 300 involves rendering one or more frames based on objects in the client object repository 185. As described above, the client object repository 185 may include objects from the most recent update from the graphics server 105 as well as, in some cases, objects received as part of previous updates. In some embodiments, the rendering subsystem 190 may render a frame using any of such objects. For instance, if two or more objects at two or more LoDs representing a single asset are stored in the client object repository 185, the rendering subsystem 190 may select one of such objects, such as an object with a higher LoD than all other objects in the client object repository 185 for that asset, to use during rendering. Various techniques exist for rendering frames based on definitions of objects in a virtual environment. Any known rendering technique, such as foveated rendering, or future rendering technique may be used to render a frame in embodiments described herein. In some embodiments, the rendering subsystem 190 renders as many frames per second as are supported by the display 170 or as many frames as possible if it not possible to render that many frames. Further, in some embodiments, the rendering subsystem 190 utilizes a GPU to render the frames.

At block 330, the process 300 involves outputting the frames rendered at block 325 to the display 170. This output is viewable by the user to enable the user to view and possibly interact with the virtual environment 195. Some embodiments of the client device 160 repeat blocks 310 through 330 while the client device 160 remains involved in the immersive graphics system 100, and in some embodiments, these operations are performed in a streaming (e.g., continuous) manner.

Examples of Causing a Client Device to Render a Virtual Environment

As described above, the graphics server 105 receives data from a client device 160, where that data includes user information or importance values. In some embodiments, when multiple client devices 160 are participating in the immersive graphics system 100, the graphics server 105 receives this respective data from each client device 160. For each such client device 160, the graphics server 105 determines a set of objects representing assets and transmits such objects as an update back to that client device 160. Below describes this process for a single client device 160, but the same or similar process may be performed by the graphics server 105 for each client device 160. In some embodiments, the graphics server 105 performs multiple parallel instances of the below process, or similar, for the multiple client devices 160 participating in the immersive graphics system 100 at a given time.

Figure 4:
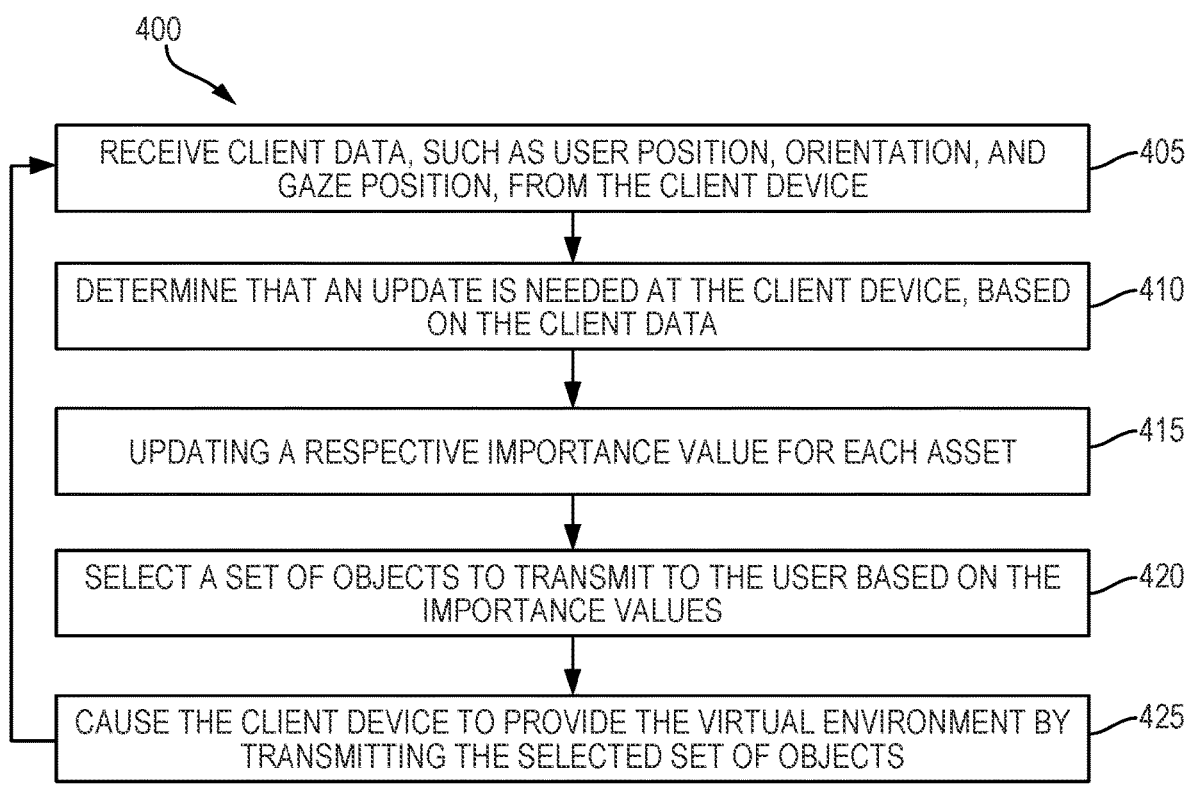
FIG. 4 is a flow diagram of an example of a process for causing a client device to provide the virtual environment to a user, according to some embodiments of this disclosure.

FIG. 4 is a flow diagram of an example of a process 400 for causing a client device 160 to provide the virtual environment 195, according to some embodiments of this disclosure. An embodiment of the graphics server 105 executes this process 400 or similar in parallel with the client device 160 executing the above process 300 of FIG. 3. The process 400 depicted in FIG. 4 may be implemented in software (e.g., code, instructions, program) executed by one or more processing units of the computer system, implemented in hardware, or implemented in a combination of software and hardware. The process 400 presented in FIG. 4 and described below is intended to be illustrative and non-limiting. Although FIG. 4 depicts various processing operations occurring in a particular sequence or order, this is not intended to be limiting. In certain alternative embodiments, the processing may be performed in a different order, or some operations may also be performed in parallel.

In some embodiments, this process 400 or similar is performed at runtime by the graphics server 105 to cause a single client device 160 to render a virtual environment 195. The graphics server 105 may execute multiple instances of this process 400 in parallel to serve multiple client devices 160. Each such client device 160 can be in use by a distinct user with distinct interactions with the virtual environment 195 (e.g., independent of interactions made by other users at other client devices 160), such as different movements through the virtual environment. Thus, depending on the interactions being performed at each client device 160, the graphics server 105 may transmit different sets of objects to the various client devices 160 and may do so at different points in time.

As shown in FIG. 4, at block 405, the process 400 involves receiving client data from the client device 160, where the client data relates to use of the client device 160. In some embodiments, the client data includes user information, such as the user position, orientation, and gaze position. Additionally or alternatively, however, the client data may include a respective importance value for each asset, where the importance values are based on the user information such as the user position, orientation, and gaze position.

At block 410, the process 400 involves determining that an update is needed at the client device 160. In some embodiments, the graphics server 105 continuously updates importance values as new client data is received from the client device 160. In some other embodiments, however, the graphics server 105 determines whether an update is needed at the client device 160 and, if so, updates the importance values upon determining that an update is needed. Various techniques can be used to determine whether an update is needed. For example, the graphics server 105 determines that an update is needed if there has been any change in the user's position, orientation, or gaze position since the last update was made, and otherwise, the graphics server 105 determines that an update is not needed.

At block 415, the process 400 involves updating importance values associated with the client device 160, including a respective importance value for each asset. In some embodiments, updating the importance values is performed by the prioritization subsystem 120 of the graphics server 105. If the client data received at block 405 includes the importance values, then the prioritization subsystem 120 may simply update the importance values associated with the client device 160 to equal the importance values received from the client device 160. However, if the client data includes user information but not importance values, then an embodiment of the prioritization subsystem 120 computes the importance values associated with the client device 160 based on the user information. Examples of computing the importance values are described in more detail below.

At block 420, the process 400 involves selecting a set of objects to transmit to the client device 160, based on the importance values for the assets, as updated at block 415. In some embodiments, selection of the objects is performed by the object-determination subsystem 130. In general, the objects are selected by solving a version of the "knapsack problem." The knapsack problem is a conceptual exercise that involves filling a hypothetical knapsack having a maximum allowed weight with various hypothetical items each having a respective weight and a respective value, such that the total value of items in the knapsack is maximized and the allowed weight is not exceeded. In some embodiments, the knapsack represents the client device bandwidth, or other network resource, available between the graphics server 105 and the client device 160; the items represent the assets; and the values represent the importance values of the assets. The weight of an asset represents, or relates to, the amount of bandwidth, or other network resource, required for transmitting an object or set of objects representing that asset. Some embodiments solve the knapsack problem to determine, for each asset, which one or more objects, if any, to send to the client device 160. Various techniques exist for solving the knapsack problem, such as implementations of heuristics. Any existing or future techniques for solving the knapsack problem may be implemented in various embodiments of the object-determination subsystem 130.

In some embodiments, the object-determination subsystem 130 takes advantage of having previously sent objects at other updates. Because the object-determination subsystem 130 keeps of record of which objects have already been sent to the client device 160, the object-determination subsystem 130 need not waste network resources re-transmitting objects that have already been sent. The object-determination subsystem 130 can also avoid transmitting, for a given asset, any objects representing that asset at a lower LoD than an object that has already been transmitted to represent the same asset. As such, when constructing and solving the knapsack problem, an embodiment of the object-determination subsystem 130 accounts for objects that have already been sent.

At block 425, the graphics server 105 causes the client device 160 by transmitting to the client device 160 the set of objects selected at block 420. After receiving the set of objects, an example of the client device 160 renders frames for output to its display 170. Some embodiments of the graphics server 105 repeat this process 400 while the client device 160 remains involved in the immersive graphics system 100, and in some embodiments, these operations are performed in a streaming (e.g., continuous) manner.

Examples of Computing Importance Values

As described above, the graphics server 105 can compute importance values for the various assets based on user information determined by the client device 160. For example, the client device 160 determines user information and transmits the user information to the graphics server 105, where the graphics server 105 computes a respective importance value for each asset. The importance value for an asset may be computed repeatedly, such as at a frequency sufficient to capture the user's movements or gaze positions. For instance, each time the user information changes, the importance values may be updated (i.e., computed again).

To take advantage of natural foveated vision, some embodiments of immersive graphics system 100 prioritize high quality and finer details in the fovea over the periphery. Thus, an example of an importance value for a given pixel x under gaze position g is computed as $\hat{P}_{ec}(g, x) = E(g-x)$, where E is defined as $E(x) = 0.5\sigma(x)^{-1}$.

An existing issue in current techniques for LoD-based procedural rendering is visual popping. Visual popping occurs when the LoD of a scene receives an update, causing an abrupt visual change that is easily noticed and distractive to the experience. The human visual system perceives LoD-introduced popping artifacts in spatial frequency as well as in retinal velocity. Some embodiments described herein avoid visual popping by prioritizing assets in the fovea.

To analytically compute temporal consistency considering the content as well as the retinal receptors and display capability, some embodiments utilize the sensitivity value $\hat{\Phi}$ for a spatial position x of the user, which may be given as follows:

$$\hat{\Phi}(g,x,I) = \int_{|f| < B(g,x)} s(f,L) c(x,f,I) df \; B(g,x) = \min(B_d, B_r(g, x)) \quad (1)$$

where I is an image (e.g., a frame displayed to the user), f is the two-dimensional frequency of I, L is the illumination, c is the local color contrast, $B_d$ is the display band from the pixel density and eye-panel distance, and $B_r$ is the supremum of the foveated retinal band. An embodiment of the immersive graphics system 100 discretizes the sensitivity value $\hat{\Phi}$. Specifically, the immersive graphics system 100 may perform a series of bandpass filtering of I to obtain the gaze- and content-aware pixel-wise sensitivity, as follows:

$$\hat{\Phi}(g,x,I) \approx \Sigma_{i=0}^{b-1} s(f_i, L) c(x, f_i, I) \quad (2)$$

In the above example, the frequency domain of Equation 1 is divided into b bands, where the $$f_i = 2^{i \frac{B(g,x)}{b}}$$

are the representative frequencies located at the midpoint of the bands. $I_i$ is the $f_i$-filtered version of I. The contrast c at point x can be defined as $$c(x, f, I) = \frac{a_f(x, I)}{a_0(x, I)},$$

where $\alpha_f$ is the approximated local frequency of the $f_i$-filtered version of I. The approximated popping (i.e., the perceived temporal intensities) between two varied frames I and I' in screen space can be given as follows:

$$\hat{\Phi}_{op}(f, I, I', x) = \sum_{i=0}^{b-1} s(f_i, L) \times \frac{|c(x, f_i, I) - c(x, f_i, I')|}{|c(x, f_i, I)| + \omega} \quad (3)$$

where g is the tracked gaze positions in I and I' respectively; and where ω is the Weber's Law adjustment intensity, which is set to a value of 10 in some embodiments. Equation 3 assumes a slow gaze/head motion with fast frame updates (e.g., ninety frames per second). Thus, the values of g in the two frames are approximately identical.

Typically, visual sensitivity is significantly suppressed during saccades (i.e., rapid eye movement between fixed faze positions). Due to the change blindness, humans perceive only weak visual popping artifacts during saccades. Thus, when a saccade is detected, an embodiment prioritizes assets that would have the most noticeable visual popping so as to reduce the popping intensity after the gaze lands. Some embodiments therefore utilize gaze-behavior-adaptive per-pixel sensitivity by combining both spatial acuity and temporal consistency models as follows:

$$\hat{P}(g, I, I', x) = \begin{cases} \hat{P}_{ec}(g, x) - \lambda \hat{P}_{op}(g, I, I', x) & \text{during gaze fixation} \\ \int \hat{P}_{op}(g', I, I', x) dg' & \text{during saccade} \end{cases} \quad (4)$$

where λ is the balance between maximizing foveated perceptual quality and minimizing visual popping artifacts during gaze fixation. In some embodiments, the value of λ can be set via experimentation, such as through a user study. In one example, λ has a value of 3.0. Because of the open challenge in real-time saccade landing prediction, an embodiment of the immersive graphics system 100 integrates over the entire visual field while computing the visual popping for saccade instead of assuming the gaze landing position. This can ensure global robustness to a user's attentional changes.

In some embodiments, the immersive graphics system 100 adapts Equation 4 for progressive LoD updates from level i+j to i as follows:

$$\hat{P}(g, I_{i+j}, I_p, x) = \Sigma_{i=1}^{i+j-1} \hat{P}(g, I_{i+1}, I_p, x) \quad (5)$$

where $I_i$ represents the image at the $i^{th}$ LoD.

The above formulas represent a screens-space model but can be adapted for a virtual environment 195 that is 3D and includes 3D assets. In some embodiments, assets can be 3D and may be represented in various forms, such as triangle meshes, volumes, terrains, or large crowded objects. The above perceptual model can depict static quality and dynamic artifacts and, as such, is applicable to individual pixels. In some embodiments, however, the assets of the virtual environment include nonuniformly distributed content, such as depth and connectivity. An embodiment of the immersive graphics system 100 applies a deferred shading algorithm to convert various types of 3D primitives to 2D perception evaluations.

Some embodiments divide 3D content (e.g., assets) based on the coarsest LoD. Thus, in the below description, an individual computational unit is denoted as $U_i$, where i is the index among all such units. For instance, a unit can be the coarsest triangle in a 3D mesh, a largest super-voxel in a volume, a texel in the coarsest mipmap level of a height/displacement texture, or a separate object in a swarm scene. The LoD of a unit $U_i$ at a time frame t (e.g., at a given point in time) is $L_{U_i, t}$.

At time frame t-1 when the LoDs of all units are already determined, an embodiment of the immersive graphics system 100 renders a frame buffer without anti-aliasing to retrieve the unit indices of every pixel or, in other words, a mapping $M_{t-1}$: $\{x\} \rightarrow \{U_i\}$ from the set of 2D pixels $\{x\}$ to the set of units $\{U_i\}$.

If the LoD of $U_i$ is updated to $L_{U_i, t}$ at timeframe t, the pixel sensitivity can be updated by accumulating all pixels of the unit at time frame t-1 as follows:

$$\hat{P}_{U_i,t}(L_{U_i,t}, g_{t-1}, M_{t-1}) \approx \Sigma_{M_{t-1}(x)=U_i} \hat{P}(g_{t-1}, I_{t-1}, \hat{I}_t | L_{U_i,t}, x) \quad (6)$$

where $g_{t-1}$, $M_{t-1}$, and $I_{t-1}$ are respectively the gaze position, unit mapping, and render image at timeframe t-1. In some embodiments, the mapping M implicitly represents the camera (i.e., the user's perspective) at each timeframe and, further, varies according to the LoDs of all units. The approximation in Equation 6 assumes for the sake of simplification that $M_{t-1} = M_t \cdot \hat{I}_t | L_{U_i,t}$ is the render image at timeframe t if the LoD of $U_i$ is $L_{U_i,t}$. The function $\hat{P}$ is denoted herein with a that due to being an approximation based on the assumption that the LoDs of other units are unchanged between timeframes t-1 and t. In some embodiments, $\hat{P}$ is dependent on the LoDs of other units $\{L_{U_j,t-1}|j\neq i\}$, but this property is omitted from Equation 6 for simplicity. The evaluation of $\hat{P}_{U_i,t}$ in Equation 6 can be computationally expensive, and thus, some embodiments of the immersive graphics system 100 (e.g., either the graphics server 105 or the client device 160, or both) utilize a neural network 125, as described further below, rather than explicitly perform this computation.

In some embodiments, the perceptual quality per bit can be evaluated by updating the LoD of a unit as follows:

$$W_{U_i,t}(L_{U_i,t}) = \frac{\hat{P}_{U_i,t}(L_{U_i,t}, g_{t-1}, M_{t-1})}{D_{U_i}(L_{U_i,t-1}, L_{U_i,t})} \quad (7)$$

where D is the data volume difference by updating the $U_i$ LoD from $L_{U_i,t-1}$ at timeframe t-1 to $L_{U_i,t}$ at timeframe t; and where $W_{U_i,t}(L_{U_i,t})$ is the weight, or importance value, assigned of the unit.

In some embodiments, a client device 160 has access to limited network bandwidth H and storage. Thus, while the virtual environment 195 is fully stored on the graphics server 105 in some embodiments, including all LoDs, the graphics server 105 need not transmit the entire virtual environment 195 to the client device 160 for a given update. During runtime, at timeframe t-1, an embodiment of the client device 160 transmits to the graphics server 105 the gaze position $g_{t-1}$. An example of the graphics server 105 already knows with objects which LoDs for each asset) are maintained by the client device 160 because the graphics server 105 previously sent those objects and, in some embodiments, received an acknowledgement.

In some embodiments, the graphics server 105 thus computes the perceptual quality per bit for updating LoDs (i.e., providing objects at higher LoDs) for each unit, such that the units assigned the greatest importance values achieve the best improvement in perceptual quality, given the constraint on the available network bandwidth H. To this end, for instance, some embodiments of the graphics server 105, or the client device 160 in some examples, solve the following:

$$\underset{\{L_{U_i,t}\}}{\operatorname{argmax}} \Sigma_i W_{U_i,t}(L_{U_i,t}) \text{ such that } \Sigma_i D_{U_i}(L_{U_i,t-1}, L_{U_i,t}) \leq H \quad (8)$$

As discussed above, Equation 8 represents a knapsack problem with the bandwidth as a parameter, specifically, such that the bandwidth H of the client device 160 acts as the maximum weight for objects that can added to the knapsack (i.e., transmitted from the graphics server 105 to the client device 160). Various techniques (i.e., heuristics) exist for solving the knapsack problem, and one or more of such techniques or future techniques can be used by the graphics server 105 or the client device 160 to determine which objects the graphics server 105 transmits to the client device 160.

In implementation, an embodiment of the graphics server 105 could compute Equation 6 for each update (e.g., each time the user information changes). Although the graphics server 105 can likely afford more computation than a client device 160, the heavy frequency domain decomposition for individual LoDs and frames in Equation 2 may cause intolerable latencies on the user. Thus, for each scene of the virtual environment, the immersive graphics system 100, or an outside component, trains a multiplayer perceptron (MLP) neural network 125 for the fast prediction of $\hat{P}_{U_i,t}$. Specifically, with a camera view $c_{t-1}$ (i.e., the position and orientation of the user) and gaze position $g_{t-1}$ as input, an embodiment of the neural network 125, or other machine-learning model, learns to compute the following:

$$N(c_{t-1}, g_{t-1}) = \{\hat{P}_{U_i}(L_{U_i,t}, g_{t-1}, M_{t-1})\} \quad (9)$$

for all units $U_i$ and possible $L_{U_i,t}$. Although some embodiments do not provide the mapping $M_{t-1}$ explicitly to the neural network 125, the neural network 125 can infer this mapping from $c_{t-1}$ once trained on a specific scene of the virtual environment 195. The diversity of projected areas of various units $U_i$ can cause $\hat{P}_{U_i}$ to have no upper bound, which can make it difficult to optimize the neural network 125. To combat this, some embodiments normalize $\hat{P}_{U_i}$ by the pixel counts of individual $\hat{P}_{U_i}$ in the projected screen space. In some embodiments, after normalization, the value of $\hat{P}_{U_i}$ is bounded by the maximum value of Equation 3. An example of the graphics server 105 stores the neural network 125, as shown in FIG. 1, and retrieves the fast-inferred $\hat{P}_{U_i}$ in place of performing the computations described in Equations 7 and 8 when making streaming determinations to provide an update another set of objects) to the client device 160.

Example Implementation Details

Some examples of implementation details are described below. These implementation details are provided for illustration purposes only and do not limit embodiments of this disclosure, Various implementations are possible and are within the scope of this disclosure.

Some embodiments described herein assume that the LoD of each object provided to the client device 160 can be set independently from one another (i.e., that no asset's LoD is dependent on another asset's LoD). While this assumption may hold true for asset types with largely independent units, such as point clouds, volumes, and crowd agents, the assumption might introduce artifacts for other asset types, such as cracks or T-junctions for triangle meshes. To ensure quality without complex implementation, some embodiments use vertex colors instead of textures and, additionally, build mesh hierarchies (i.e., various objects with varying LoDs) by subsampling existing vertices without changing their positions.

Some embodiments prepare a data set for training the neural network 125 by sampling short sequences of camera and or gaze movements inside a 3D scene at ninety frames per second. Then offline computed pairs of $\{(ct-1,gt-1), \hat{P}_{U_i}(L_{U_i},g_{t-1},M_{t-1})\}$ may be used to train the neural network 125. Because adjacent frames are likely to have similar data, some embodiments sample four frames per second and compute the ground truth $\hat{P}_{U_i}$ for all $U_i$ and LoDs offline.

An example of the neural network 125 is fully connected and includes (a) three inner layers with respectively one hundred, one thousand, and one thousand neurons, each with rectified linear unit (ReLU) activations and (b) an output layer with sigmoid activation. The neural network 125 is trained with L1 loss for approximately ten million iterations.

Example of a Computing System for Implementation

Figure 5:
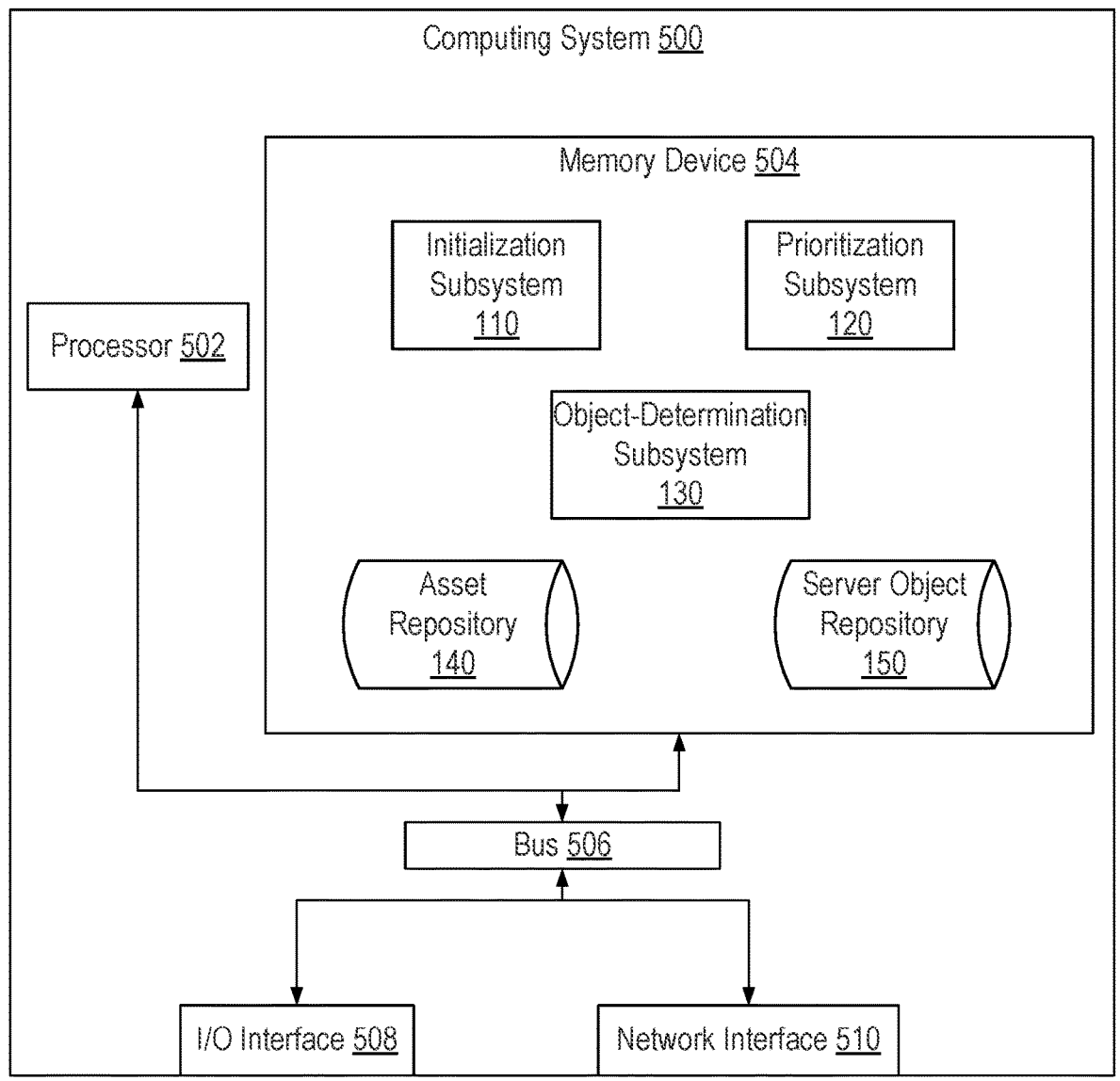
FIG. 5 is a diagram of an example of a computing system that performs certain operations described herein, according to some embodiments of this disclosure.

Any suitable computing system or group of computing systems can be used for performing the operations described herein. For example, FIG. 5 depicts an example of a computing system 500 that acts as the graphics server 105 and, as such, executes one or more of the initialization subsystem 110, the prioritization subsystem 120, or the object-determination subsystem 130. In some embodiments, however, a separate computing system having devices similar to those depicted in FIG. 5 (e.g., a processor, a memory, etc.) executes one or more of such subsystems, such as the initialization subsystem 110.

The depicted example of a computing system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 500 may also include a number of external or internal devices, such as input or output devices. For example, the computing system 500 is shown with one or more input/output ("I/O") interfaces 508. An I/O interface 508 can receive input from input devices or provide output to output devices. One or more buses 506 are also included in the computing system 500. The bus 506 communicatively couples one or more components of a respective one of the computing system 500.

The computing system 500 executes program code that configures the processor 502 to perform one or more of the operations described herein. The program code includes, for example, the initialization subsystem 110, the prioritization subsystem 120, the object-determination subsystem 130, or other suitable applications that perform one or more operations described herein. The program code may be resident in the memory device 504 or any suitable computer-readable medium and may be executed by the processor 502 or any other suitable processor. In some embodiments, each of the initialization subsystem 110, the prioritization subsystem 120, and the object-determination subsystem 130 is stored in the memory device 504, as depicted in FIG. 5. In additional or alternative embodiments, one or more of the initialization subsystem 110, the prioritization subsystem 120, or the object-determination subsystem 130 are stored in different memory devices of different computing systems. In additional or alternative embodiments, the program code described above is stored in one or more other memory devices accessible via, a data network.

The computing system 500 can access one or more of the asset repository 140 or the server object repository 150 in any suitable manner. In some embodiments, some or all of the data sets, models, and functions described herein are stored in the memory device 504, as in the example depicted in FIG. 5. For another example, however, a different computing system that trains the neural network 125 of the prioritization subsystem 120 executes the prioritization system and can provide remote access to the trained neural network 125.

The computing system 500 also includes a network interface device 510. The network interface device 510 includes any device or group of devices suitable for establishing a wired or wireless data connection to one or more data networks. Non-limiting examples of the network interface device 510 include an Ethernet network adapter, a modem, and the like. The computing system 500 is able to communicate with one or more other computing devices (e.g., one or more client devices 160) via a data network using the network interface device 510. In some embodiments, the capabilities of the network interface device 510 contribute to the network bandwidth, which can play a role in determining which objects, at which LoDs, are transmitted to the client devices 160.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
    accessing a first object representing a first asset at a first level of detail (LoD), wherein the first asset is located in a virtual environment;
    generating a second object representing the first asset at a second LoD, wherein the second LoD has decreased complexity as compared to the first LoD;
    determining a first importance value for the first asset;
    selecting the first object over the second object to represent the first asset at the first LoD in the virtual environment, based on the first importance value for the first asset;
    accessing a third object representing a second asset at the first LoD;
    generating a fourth object representing the second asset at the second LoD;
    determining a second importance value for the second asset, wherein the second importance value is lower than the first importance value;
    selecting the fourth object over the third object to represent the second asset at the second LoD in the virtual environment, based on the second importance value for the second asset; and
    causing a client device to update a display of the virtual environment by transmitting, to the client device, the first object representing the first asset and the fourth object representing the second asset.

2. The method of claim 1, wherein determining the first importance value for the first asset comprises:
    receiving a gaze position from the client device; and
    applying a machine-learning model to the gaze position to compute the first importance value.

3. The method of claim 2, wherein applying the machine-learning model to the gaze position comprises applying the machine-learning model to the gaze position occurring during a saccade to compute the first importance value.

4. The method of claim 2, wherein determining the first importance value for the first asset further comprises receiving from the client device a position and orientation of a user of the client device, wherein the machine-learning model is further applied to the position and orientation of the user.

5. The method of claim 1, the operations further comprising:
    accessing an updated gaze position of a user of the client device;
    selecting a set of objects for transmission to the client device, based on the updated gaze position; and
    causing the client device to update the display of the virtual environment by transmitting, to the client device, the set of objects.

6. The method of claim 5, wherein accessing the updated gaze position of the user of the client device comprises receiving the updated gaze position from the client device.

7. The method of claim 5, wherein selecting the set of objects comprises:
    computing an updated first importance value for the first asset; and
    selecting, for inclusion in the set of objects, the second object to represent the first asset, based on the updated first importance value being higher than the first importance value.

8. The method of claim 1, wherein selecting the first object over the second object to represent the asset comprises solving a knapsack problem having a parameter based on a network bandwidth.

9. The method of claim 1, wherein determining the first importance value comprises:
receiving a gaze position from the client device; and
computing the first importance value as a function of the gaze position.

10. The method of claim 1, wherein determining the first importance value comprises receiving from the client device a set of importance values associated with assets in the virtual environment.

11. A system comprising:
a server comprising one or more processing devices configured to perform server operations comprising:
accessing a first asset and a second asset located in a virtual environment;
generating a first object representing the first asset at a first level of detail (LoD);
generating a second object representing the first asset at a second LoD, wherein the second LoD has increased complexity over the first LoD;
computing a first importance value for the first asset, based on a gaze position of a user of a client device;
selecting the first object over the second object to represent the first asset at the first LoD in the virtual environment, based on the first importance value for the first asset;
transmitting to the client device the first object representing the first asset;
generating a third object representing the second asset at the first LoD;
generating a fourth object representing the second asset at the second LoD;
computing a second importance value for the second asset, based on the gaze position, wherein the second importance value is lower than the first importance value;
selecting the fourth object over the third object to represent the second asset in the second LoD in the virtual environment, based on the second importance value for the second asset; and
transmitting to the client device the fourth object representing the second asset.

12. The system of claim 11, wherein computing the importance value for the asset comprises applying a neural network to the gaze position, a position of the user, and an orientation of the user.

13. The system of claim 11, wherein the server operations further comprise:
detecting a change in the gaze position;
updating the importance value based on the change in the gaze position; and
selecting a set of objects to transmit to the client device based on the updated importance value.

14. The system of claim 11, wherein the server operations further comprise:
detecting a saccade of the user of the client device; and
updating the importance value based on the saccade; and
selecting a set of objects to transmit to the client device based on the updated importance value.

15. The system of claim 11, wherein selecting the first object over the second object to represent the asset comprises solving a knapsack problem having a parameter based on a network bandwidth.

16. A non-transitory computer-readable medium embodying program code for providing a virtual environment, the program code comprising instructions that, when executed by a processor, cause the processor to perform operations comprising:
accessing a first asset and a second asset located in a virtual environment;
generating a first object representing the first asset at a first level of detail (LoD);
generating a second object representing the first asset at a second LoD, wherein the second LoD has decreased complexity as compared to the first LoD;
determining a first importance value for the first asset;
a step for selecting the first object over the second object to represent the first asset at the first LoD in the virtual environment, based on the first importance value for the first asset;
generating a third object representing the second asset at the first LoD;
generating a fourth object representing the second asset at the second LoD;
determining a second importance value for the second asset, wherein the second importance value is lower than the first importance value;
a step for selecting the fourth object over the third object to represent the second asset in the second LoD in the virtual environment, based on the second importance value for the second asset; and
a step for causing a client device to update a display of the virtual environment by transmitting, to the client device, the first object representing the first asset and the fourth object representing the second asset.

17. The non-transitory computer-readable medium of claim 16, wherein determining the first importance value for the first asset comprises:
receiving a gaze position from the client device; and
applying a machine-learning model to the gaze position to compute the first importance value.

18. The non-transitory computer-readable medium of claim 16, the operations further comprising:
computing an additional importance value for the first asset based on a change in gaze portion of a user of the client device;
selecting the second object over the first object based on the additional importance value; and
causing the client device to update the display by transmitting to the client device the second object to represent the first asset.

19. The non-transitory computer-readable medium of claim 18, wherein the first object representing the first asset at the first LoD has fewer vertices than the second object representing the first asset at the second LoD, and wherein the additional importance value is higher than the first importance value.

20. The non-transitory computer-readable medium of claim 18, wherein selecting the second object over the first object to represent the asset comprises solving a knapsack problem having a parameter based on a network bandwidth.

* * * * *